7364X
STRONG & STERRY.
Hoe.
Patented Jan. 5, 1833.
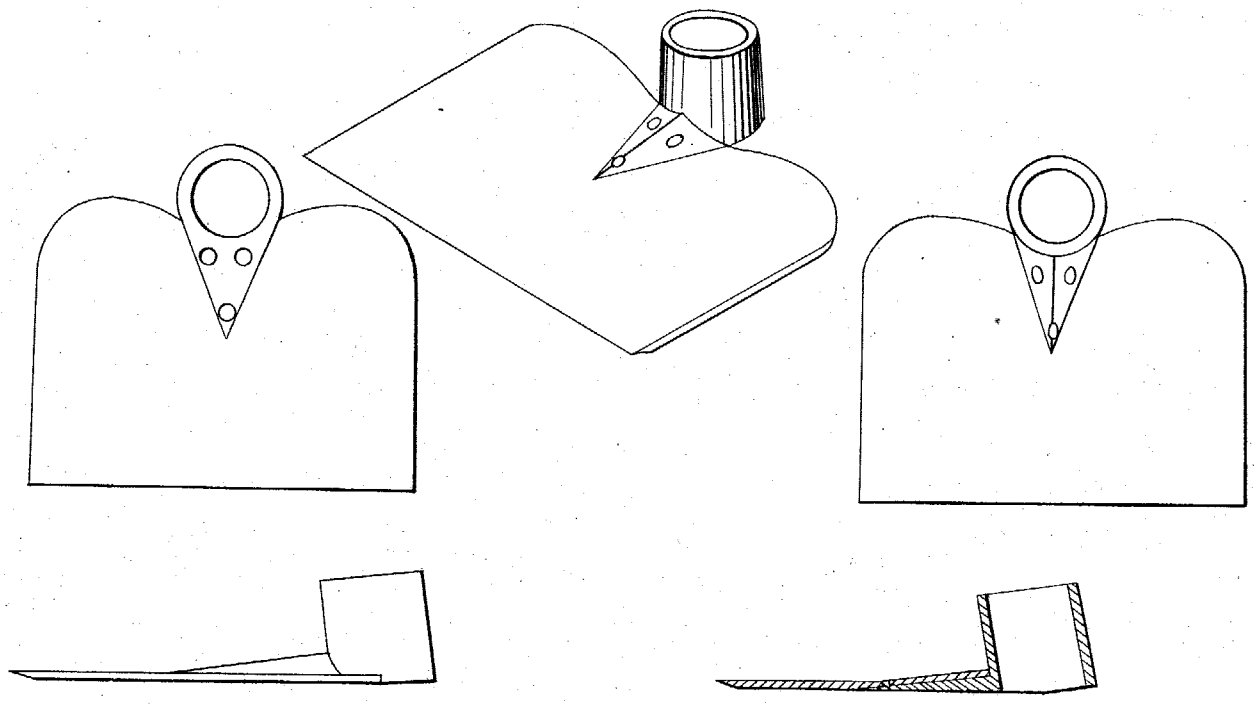
AM. PHOTO-LITHO. CO. N.Y. (OSBORNE'S PROCESS)

7364x

Jan 5, 1833 215

Charles H. Storry & Edward A. Storry, of Norwich, Connecticut,

Letters Patent,

The schedule referred to in these Letters Patent and making part of the same containing a description in the words of the said Charles H. Storry & Edward A. Storry, themselves of their improvement in the mode of making Hoes,—

To all to whom these presents shall come

Be it known that We, Charles H. Storry and Edward A. Storry of Norwich in the County of New London & State of Connecticut have invented a new and useful improvement in the mode of making Hoes called "Storry's improved Hoe" & that the following is a full & exact description of the construction of the said Hoe, as invented or improved by us, This improvement in making rivetted eye, or brazed eye hoes, consists in sinking the shank of the eye, (which eye is similar in shape, & position to that of the common or old fashioned welded eye hoe) its whole thickness into the under surface of the plate so as to leave the under surface of the hoe entirely smooth, thereby obviating two great objections, to the common rivetted eye hoes which are,—

1st that the shank of the eye being placed on the outside of the plate, it clogs and accumulates dirt, &c 2nd that the hole of the eye is struck thro' the plate (instead of being raised above the top of it) which brings the handle too near the ground.( The hoe is to be made of rolled steel & the eye is to be secured with rivets or brazed on, as further experiment may prove to be best The utility of the plan is this, A hole nearly the same in shape as the old fashioned or common welded eye & equally strong or stronger can be made at a much less cost than the latter because that cannot easily be made of rolled steel, but the plate of each hoe is separately hammered out after the eye 7364x Jan 5, 1833

216 is subject on, :— We claim, that the plan of a circular eye or tongue eye, the bar of which is flush above the top of the bar & the shank of which is sunk it thickness into the plate, so as to leave the under surface of the bar smooth, & such is of our invention Norwich December 24th 1832, Witnesses James Hodges
Edw. A. Huntington Charles H. Strong.
Edw. A. Sterry.

[446 ...